United States Patent
Sjunnesson et al.

(10) Patent No.: US 6,758,266 B1
(45) Date of Patent: Jul. 6, 2004

(54) WORK MACHINE HAVING A HYDRAULIC LIQUID COOLING AND HEATING SYSTEM

(75) Inventors: Halvar Sjunnesson, deceased, late of Skogstorp (SE), by Mihaela Sjunnesson, legal representative; by Carina Sjunnesson, legal representative, Sollentuna (SE); by Ulrika Sjunnesson, legal representative, Barberino de Mugello (IT)

(73) Assignee: Volvo Wheel Loader AB, Eskilstuna (SE)

( * ) Notice: Subject to any disclaimer, the term of this patent is extended or adjusted under 35 U.S.C. 154(b) by 0 days.

(21) Appl. No.: 09/623,130
(22) PCT Filed: Feb. 16, 1999
(86) PCT No.: PCT/SE99/00201
§ 371 (c)(1),
(2), (4) Date: Dec. 7, 2000
(87) PCT Pub. No.: WO99/43931
PCT Pub. Date: Sep. 2, 1999

(30) Foreign Application Priority Data

Feb. 27, 1998 (SE) ............................................... 9800619

(51) Int. Cl.[7] .............................................. B60K 11/00
(52) U.S. Cl. ....................... 165/299; 165/300; 165/253; 165/43; 165/51; 165/140; 123/41.33; 123/41.49; 180/68.1
(58) Field of Search ............................ 165/41, 42, 43, 165/201, 202, 58, 61, 65, 51, 253, 259, 299, 300, 140; 123/41.31, 41.33, 41.49, 263, 90.12; 180/68.1, 68.3; 60/456, 453, 422

(56) References Cited

U.S. PATENT DOCUMENTS

| | | | | |
|---|---|---|---|---|
| 2,670,933 A | * | 3/1954 | Bay ........................ 165/140 X |
| 3,752,222 A | * | 8/1973 | Olbermann, Jr. .......... 165/51 X |
| 4,124,001 A | * | 11/1978 | Samuel et al. | |
| 4,223,646 A | * | 9/1980 | Kinder | |
| 4,317,439 A | * | 3/1982 | Emmerling | |
| 4,322,949 A | * | 4/1982 | Byrne et al. | |
| 4,323,137 A | * | 4/1982 | Bando et al. | |
| 4,325,452 A | * | 4/1982 | Bando et al. | |
| 4,393,824 A | | 7/1983 | Fischer et al. ........ 123/196 AB |
| 4,485,624 A | * | 12/1984 | Melchior ................ 165/299 X |
| 4,539,943 A | * | 9/1985 | Tsuchikawa et al. | |
| 4,546,742 A | * | 10/1985 | Sturges | |
| 4,556,024 A | * | 12/1985 | King et al. .............. 165/51 X |
| 4,570,849 A | * | 2/1986 | Klaucke et al. | |
| 4,861,187 A | * | 8/1989 | Sinkkonen ................ 165/51 X |
| 5,042,602 A | * | 8/1991 | Nakatani et al. .......... 165/41 X |

(List continued on next page.)

FOREIGN PATENT DOCUMENTS

| | | |
|---|---|---|
| DE | 41 40 667 | 6/1993 |
| FR | 2 450 720 | 10/1980 |
| GB | 920614 | 3/1963 |
| JP | 4-317816 | * 11/1992 |

*Primary Examiner*—Ljiljana Ciric
(74) *Attorney, Agent, or Firm*—Young & Thompson

(57) ABSTRACT

A work machine, such as a wheeled loader or dumper, has a cooling and heating system comprising a main line (2) arranged to contain a fluid, a first heat exchanger (4) which is connected to the main line (2), and a charge-air cooler (8) for cooling compressed charge air for an internal combustion engine (12) arranged in the machine, which charge-air cooler (8) is connected to the main line (2). A second heat exchanger (10) is connected to the main line (2) downstream of the charge-air cooler (8), to which second heat exchanger (10) a hydraulic liquid line (14) is connected, so that heat can be transferred between the fluid in the main line (2) and the hydraulic liquid in the hydraulic liquid line (14).

12 Claims, 2 Drawing Sheets

U.S. PATENT DOCUMENTS 5,097,891 A * 3/1992 Christensen .................. 165/41
5,165,377 A * 11/1992 Hosseini
5,174,098 A * 12/1992 Emery
5,234,051 A * 8/1993 Weizenburger et al. ....... 165/41
5,255,733 A * 10/1993 King ...................... 165/300 X
5,318,100 A * 6/1994 Aoki
5,386,873 A * 2/1995 Harden, III et al. ...... 165/51 X
5,394,854 A * 3/1995 Edmaier et al.
5,993,312 A * 11/1999 Panoushek et al.
6,029,445 A * 2/2000 Lech ........................... 60/422
6,030,314 A * 2/2000 Brooks et al.
6,037,567 A * 3/2000 Inoue et al. ............ 165/300 X
6,129,056 A * 10/2000 Skeel et al. .............. 123/41.49
6,354,089 B1 * 3/2002 Lech et al.
6,397,593 B1 * 6/2002 Duckinghaus ............... 60/456
6,405,793 B1 * 6/2002 Ghodbane et al. ...... 165/140 X

* cited by examiner

WORK MACHINE HAVING A HYDRAULIC LIQUID COOLING AND HEATING SYSTEM

FIELD OF THE INVENTION

The present invention relates to a cooling and heating system for a machine, such as a wheeled loader or dumper.

BACKGROUND OF THE INVENTION

Machines such as wheeled loaders and dumpers comprise a number of components which are controlled by hydraulics. For example, hydraulic cylinders are used in order to operate a working implement, such as a scoop, which is arranged on a loading arm assembly of a wheeled loader.

When the machine is cold-started, it is desirable to increase the temperature of the hydraulic liquid in the hydraulic system of the machine rapidly so as to reduce friction and wear in hydraulic cylinders and other hydraulic components. Reduced friction results in the fuel consumption of the vehicle being lower. When the temperature increases, the quantity of water given off from the hydraulic liquid also increases, which is desirable.

When the hydraulic liquid has been heated up and the hydraulic components of the machine are used, heat is generated as a result of the increase in pressure in the hydraulic liquid. The hydraulic liquid must then be cooled so that the hydraulics system is not damaged by the temperature of the hydraulic liquid being too high.

In order to reduce friction losses and thus reduce the fuel consumption of the machine, it is also desirable that the transmission oil in the gearbox of the machine and the lubrication oil in the wheel axles of the machine are heated up rapidly when the machine is cold-started.

In the same way as for the hydraulics system, it is necessary to cool the transmission oil and lubrication oil when the machine is used in order that the gearbox and the wheel axles are not damaged.

It is previously known to heat up the hydraulic liquid of a machine by means of the cooling water from an internal combustion engine in the machine. The disadvantage of heating the hydraulic liquid using the cooling water of the internal combustion engine is that it takes too long to heat up the hydraulic liquid, which results in high fuel consumption when the machine is cold-started.

SUMMARY OF THE INVENTION

The object of the present invention is to bring about rapid heating up of the hydraulic liquid of a machine in order to reduce the fuel consumption of the machine when cold-started.

Another object of the present invention is to achieve rapid heating up of the lubrication oil for at least one wheel axle of the machine.

A further object of the present invention is to achieve rapid heating up of the transmission oil for a gearbox of the machine.

A further object of the invention is to achieve cooling of the hydraulic liquid, the lubrication oil and the transmission oil during operation of the vehicle.

Such a cooling and heating system provides rapid heating up of the hydraulic liquid, the lubrication oil and the transmission oil, which reduces the fuel consumption of the machine, and also reduces wear on the hydraulics system, the wheel axles and the gearbox of the machine. The cooling and heating system also provides controlled cooling of the hydraulic liquid, the lubrication oil and the transmission oil when the machine is used.

BRIEF DESCRIPTION OF THE DRAWINGS

The invention will be described in greater detail by means of the appended figures showing exemplary embodiments, in which.

DETAILED DESCRIPTION OF THE INVENTION

Figure 1:
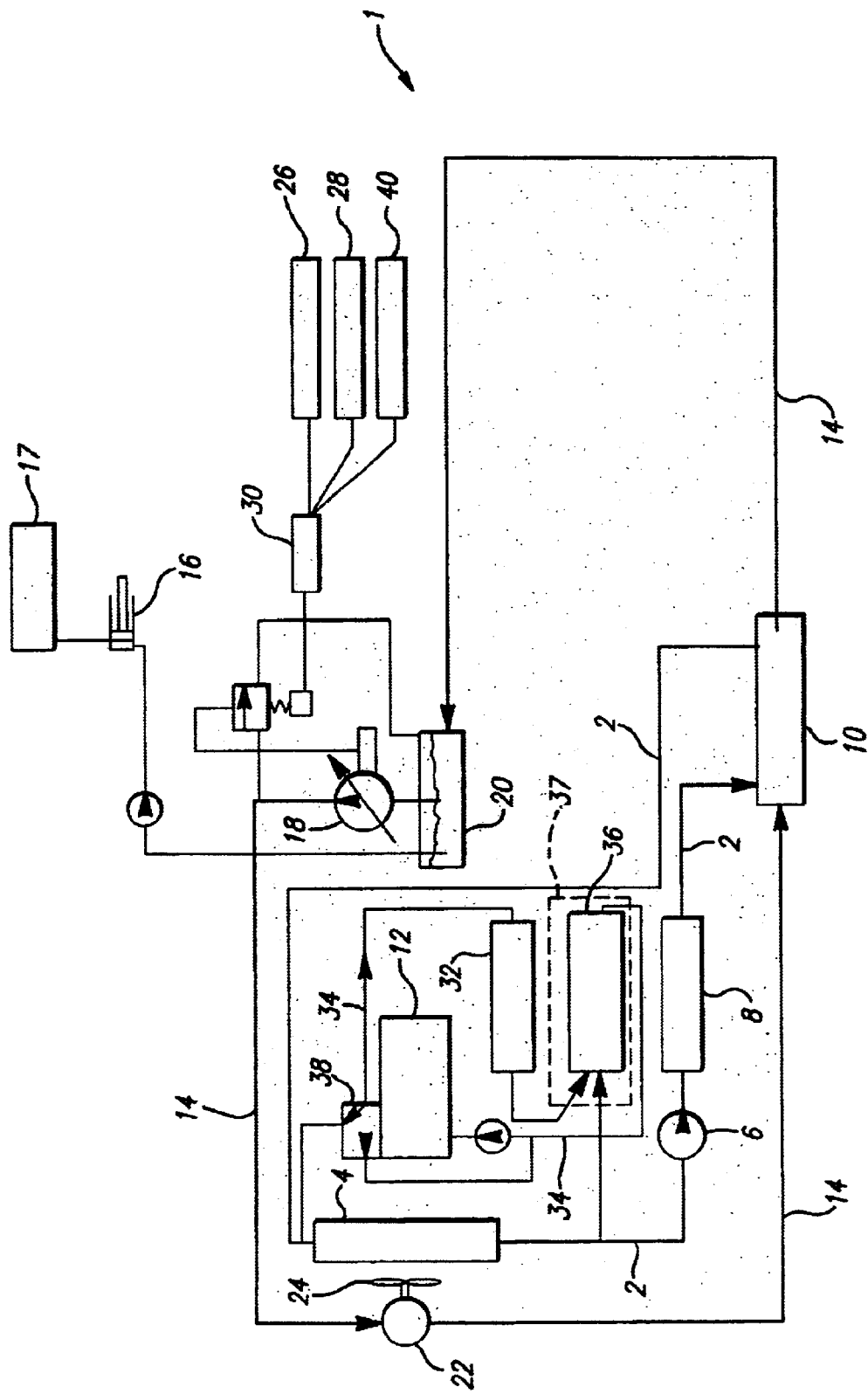
FIG. 1 shows a cooling and heating system according to a first embodiment of the present invention.

The cooling and heating system 1 according to FIG. 1 comprises a main line 2 which is connected to a first heat exchanger 4, a feed pump 6, a charge-air cooler 8 and a second heat exchanger 10. The main line 2 contains a fluid. The feed pump 6 causes the fluid to circulate in the main line 2.

The first heat exchanger 4 can, as shown in FIG. 1, constitute a radiator for an internal combustion engine 12 which is used to drive the machine in which the cooling and heating system 1 is arranged. The charge-air cooler 8 is arranged so as to cool compressed charge air which is to be supplied to the internal combustion engine 12. The compression of the charge air is brought about by an exhaust-gas turbo or compressor (not shown). The charge air is heated up during compression. In order to obtain a greater air mass per unit of volume in the fuel/air mixture in the internal combustion engine 12 and thus increase the power rating of the internal combustion engine 12, the charge air is cooled in the charge-air cooler 8. As shown in FIG. 1, the second heat exchanger 10 is connected to the main line 2 downstream of the charge-air cooler 8. The heat given off from the charge air to the fluid in the main line 2 will be conveyed by the fluid to the second heat exchanger 10.

A hydraulic liquid line 14 is connected to the second heat exchanger 10. In the hydraulic liquid line 14, hydraulic liquid circulates, which is used for inter alia various hydraulic components 16 of the machine, such as hydraulic cylinders to operate a working implement 17 of the machine. The hydraulic liquid is caused to circulate by means of a variable hydraulic liquid pump 18 which is connected to the hydraulic liquid line 14. The hydraulic liquid flows to a hydraulic liquid tank 20. From the hydraulic tank 20, the hydraulic liquid is pumped to the hydraulic components 16 of the machine.

A first hydraulic motor 22 is connected to the hydraulic liquid line 14, which first hydraulic motor 22 is arranged so as to drive a fan 24 which is arranged so as to bring about an air flow through the first heat exchanger 4 in order to cool the fluid in the main line 2.

When the machine is cold-started, the hydraulic liquid in the hydraulic liquid line 14 is cold. When the hydraulic components 16 of the machine are used, the wear and the friction in the hydraulic components 16 will be great, which leads to the machine having to perform a great deal of work to drive the hydraulic components 16. This leads to the fuel consumption of the machine increasing.

As the charge air is cooled by the charge-air cooler 8 as soon as the internal combustion engine 12 is started, the heat carried away from the charge-air cooler 8 will be supplied to the second heat exchanger 10, as described above. As the hydraulic liquid passes through the second heat exchanger 10, the heat from the fluid in the main line 2 will be transferred to the hydraulic liquid which is thus heated up.

When the hydraulic liquid has reached a suitable working temperature, the fluid in the main line 2 will carry away any excess heat from the hydraulic liquid. This is brought about by virtue of the fluid which passes through the second heat exchanger 10 also passing through the first heat exchanger 4 in which cooling of the fluid takes place.

A first temperature sensor 26 is positioned in the hydraulic liquid tank 20 and a second temperature sensor 28 is positioned in the first heat exchanger 4, in contact with the fluid. The first and second sensors 26, 28 are connected to a control unit 30 which controls the variable hydraulic liquid pump 18. By increasing the flow of the variable hydraulic pump 18, the fan 24 will bring about increased cooling of the fluid in the main line 2.

FIG. 1 also shows a cab heat exchanger 32 which is connected to a cooling water line 34 for the internal combustion engine 12. The purpose of the cab heat exchanger 32 is to heat up a cab (not shown) in which a driver, who drives the machine, sits. A transmission heat exchanger 36 is also connected to the cooling water line 34 of the internal combustion engine 12, downstream of the cab heat exchanger 32. The transmission heat exchanger 36 is connected to a gearbox 37 of the machine. On cold-starting, cooling water, which is heated up by the internal combustion engine 12, will pass through the cab heat exchanger 32 and the transmission heat exchanger 36. This results in rapid heating up of both the cab and the gearbox. On cold-starting, the cooling water does not pass through the first heat exchanger 4, which is ensured by a thermostat 38 of the internal combustion engine 12.

When the internal combustion engine 12 is hot, the thermostat 38 opens and the cooling water is conveyed through the first heat exchanger 4. Cooling of the gearbox can be brought about if the temperature of the gearbox exceeds the temperature of the cooling water. As shown in FIG. 1, the main line 2 can be connected to the cooling water line 34, so that the liquid circulating in the main line 2 also circulates in the cooling water line 34.

A third temperature sensor 40 is positioned in the gearbox and connected to the control unit 30. If the third temperature sensor 40 sends signals to the control unit 30 that the gearbox or transmission oil in the gearbox is too hot, the variable hydraulic liquid pump 18 increases the flow of hydraulic liquid so that the cooling by the fan 24 of the cooling water in the first heat exchanger 4 increases.

Figure 2:
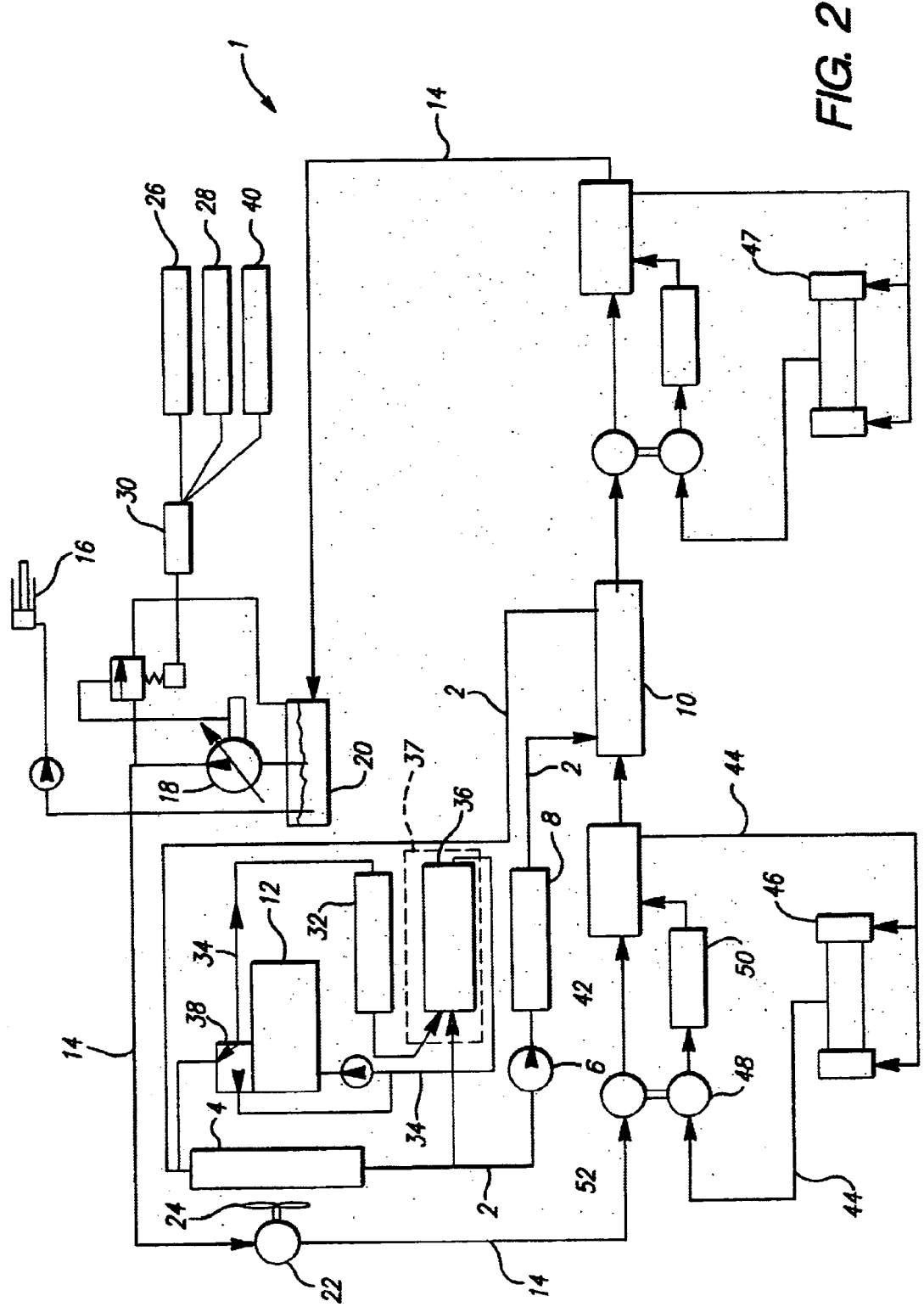
FIG. 2 shows a cooling and heating system according to a second embodiment of the present invention.

FIG. 2 shows a second embodiment of the invention. Connected to the hydraulic liquid line 14 is a third heat exchanger 42 which is arranged so as to cool or heat the lubrication oil which is contained in a lubrication oil line 44. The lubrication oil line 44 is connected to the third heat exchanger 42, a wheel axle 46 of the machine, a lubrication oil pump 48, a filter 50 and on to the third heat exchanger 42 in order to form a closed circuit. The lubrication oil pump 48 is driven by a second hydraulic motor 52 which is connected to the hydraulic liquid line 14.

When the machine is cold-started, the lubrication oil is viscous, which results in the friction and wear on the wheel axle 46 and the transmission (not shown) present on the wheel axle 46 increasing. As the hydraulic liquid will be heated up rapidly on cold-starting, as described above, the lubrication oil in the lubrication oil line 44 will also be heated up by the heated hydraulic liquid. This heat transfer takes place in the third heat exchanger 42. The lubrication oil line 44 described, which forms a closed circuit, can be provided for each wheel axle 46 of the vehicle. FIG. 2 shows two separate closed circuits for two wheel axles 46, 47 of the machine. Alternatively, one closed circuit can be provided for two or more wheel axles.

When the machine is used, heat is generated in the wheel axles 46, 47. This heat can be carried away by means of the lubrication oil and the third heat exchanger 42.

What is claimed Is:

1. A work machine having an internal combustion engine for driving the machine and at least one hydraulic cylinder, the machine having a cooling and heating system comprising:
    a main line for a cooling fluid connected for cooling the engine;
    a hydraulic liquid line for a hydraulic liquid connected for supplying the hydraulic cylinder with hydraulic liquid;
    a first heat exchanger coupled to the main line and the hydraulic liquid line for transferring heat between the cooling fluid in the main line and the hydraulic liquid in the hydraulic liquid line;
    a second heat exchanger coupled to the main line for heat exchange between the cooling fluid and air;
    a variable hydraulic liquid pump connected to the hydraulic liquid line, which hydraulic liquid pump is disposed so as to bring about a variable hydraulic liquid flow in the hydraulic liquid line;
    a first hydraulic motor connected to the hydraulic liquid line;
    a fan driven by the hydraulic motor and disposed so as to bring about an air flow through said second heat exchanger in order to cool the fluid in the main line; and
    a third heat exchanger connected to the hydraulic liquid line and to a lubrication oil line and at least one wheel axle of the machine connected to said third heat exchanger so that heat can be transferred between any lubrication oil in said lubrication oil line and said hydraulic liquid.

2. The work machine according to claim 1, further comprising a working implement, and wherein at least one of the hydraulic cylinders is configured to operate the working implement of the machine.

3. The work machine according to claim 1, further comprising a tank, and wherein said hydraulic liquid line is connected to the tank.

4. The work machine according to claim 1, further comprising a charge air cooler coupled to the main line for cooling already compressed air, which is to be supplied to the engine.

5. The work machine according to claim 4, wherein said first heat exchanger for transferring heat between the cooling fluid in the main line and the hydraulic liquid in the hydraulic liquid line is disposed downstream of said charge air cooler.

6. The work machine according to claim 1, further comprising:
    a temperature measuring part to measure the temperature of said fluid and to measure the temperature of said hydraulic liquid, and
    a control unit connected to the hydraulic liquid pump to control the hydraulic liquid pump in response to the measured temperature of said fluid and to the measured temperature of said hydraulic liquid.

7. A work machine, comprising:
    an internal combustion engine configured to drive the machine;

at least one hydraulic cylinder; and a cooling and heating system comprising a main line for a cooling fluid connected to the engine, a hydraulic liquid line for a hydraulic liquid connected to the hydraulic cylinder, a first heat exchanger coupled to the main line and the hydraulic liquid line for transferring heat between the cooling fluid in the main line and the hydraulic liquid in the hydraulic liquid line, a second heat exchanger coupled to the main line for heat exchange between the cooling fluid and air, a variable hydraulic liquid pump connected to the hydraulic liquid line and configured to bring a variable hydraulic liquid flow in the hydraulic liquid line, a first hydraulic motor connected to the hydraulic liquid line, a fan driven by the hydraulic motor and disposed to bring an air flow through said second heat exchanger in order to cool the fluid in the main line, and a third heat exchanger connected to the hydraulic liquid line and to a lubrication oil line and at least one wheel axle of the machine connected to said third heat exchanger so that heat can be transferred between any lubrication oil in said lubrication oil line and any hydraulic liquid in said hydraulic liquid line.

8. The work machine according to claim 7, further comprising a second hydraulic motor connected to the hydraulic liquid line to drive a lubrication oil pump connected to the lubrication oil line.

9. The work machine according to claim 7, further comprising wheel axles, and wherein the lubrication oil line is connected to the wheel axles of the machine.

10. The work machine according to claim 7, wherein the lubrication oil line forms a separate circuit for each of a plurality of wheel axles of the machine.

11. The work machine according to claim 1, further comprising a cooling water line connected to the internal combustion engine and including a cab heat exchanger and a transmission heat exchanger in a gear box of the machine, said transmission heat exchanger being connected to the cooling water line downstream of said cab heat exchanger.

12. The work machine according to claim 11, further comprising:

a temperature measuring part configured to measure the temperature of transmission oil in the gear box, and a control unit that controls the hydraulic liquid pump in response to the measured temperature of said transmission oil in the gear box.

* * * * *